(12) United States Patent
Brandt

(10) Patent No.: US 9,803,795 B2
(45) Date of Patent: Oct. 31, 2017

(54) TELESCOPING RAIL MOUNTING ASSEMBLY AND MULTIPLE DISPLAY MOUNT SYSTEM

(71) Applicant: MILESTONE AV TECHNOLOGIES LLC, Eden Prairie, MN (US)

(72) Inventor: Jamie Brandt, Savage, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 14/397,813

(22) PCT Filed: Mar. 11, 2013

(86) PCT No.: PCT/US2013/030243
§ 371 (c)(1),
(2) Date: Oct. 29, 2014

(87) PCT Pub. No.: WO2013/165562
PCT Pub. Date: Nov. 7, 2013

(65) Prior Publication Data
US 2015/0131217 A1    May 14, 2015

Related U.S. Application Data

(60) Provisional application No. 61/641,670, filed on May 2, 2012.

(51) Int. Cl.
*G06F 1/16* (2006.01)
*F16M 11/18* (2006.01)
(Continued)

(52) U.S. Cl.
CPC ............. *F16M 11/18* (2013.01); *F16M 11/06* (2013.01); *F16M 11/2014* (2013.01);
(Continued)

(58) Field of Classification Search
CPC .... G06F 1/1616; G06F 1/1601; G06F 1/1654; G06F 7/08; G06F 1/1613; G06F 1/1626;
(Continued)

(56) References Cited

U.S. PATENT DOCUMENTS

2005/0258319 A1    11/2005  Jeong
2007/0097609 A1*   5/2007  Moscovitch ........... F16M 11/04
                                                       361/679.04
(Continued)

FOREIGN PATENT DOCUMENTS

KR     20-0426109000        9/2006

OTHER PUBLICATIONS

PCT Notification Concerning Transmittal of International Preliminary Report on Patentability, International Preliminary Report on Patentability, and Written Opinion of the International Searching Authority, Cited in PCT/US2013/030243, dated Nov. 13, 2014, 9 Pgs.

*Primary Examiner* — Anthony Haughton
*Assistant Examiner* — Ingrid Wright
(74) *Attorney, Agent, or Firm* — Patterson Thuente Pedersen, P.A.

(57) ABSTRACT

A multiple display mount system that offers easy and efficient, independent lateral and vertical adjustment of each individual display. The system includes a base, a vertical member extending upwardly from the base, and a pair of arms extending laterally outward on opposing sides of the vertical member. A pair of display interfaces is operably coupled to a separate one of the arms. Each of the display interfaces can enable the electronic display received thereon to be tilted about a generally horizontal tilt axis extending through the electronic display, and/or enable the electronic display received thereon to be pivoted about a generally vertical axis extending through the electronic display. The (Continued)

arms may be pivotally connected to the vertical member to enable positioning of the displays, and the displays may be separately vertically positionable relative to the vertical member.

12 Claims, 12 Drawing Sheets

(51) Int. Cl.
*F16M 11/20* (2006.01)
*F16M 11/06* (2006.01)
*F16M 13/00* (2006.01)

(52) U.S. Cl.
CPC ..... *F16M 11/2085* (2013.01); *F16M 11/2092* (2013.01); *F16M 13/00* (2013.01); *G06F 1/1601* (2013.01); *F16M 2200/027* (2013.01)

(58) Field of Classification Search
CPC .......... G06F 3/1446; G06F 2200/1612; H05K 5/0221; H05K 5/0234; H05K 5/0017; H05K 5/0217; H05K 7/00; H05K 7/1447; F16M 11/18; F16M 11/06; F16M 13/00; F16M 11/10; F16M 11/2014; F16M 2200/041; F16M 2200/08; F16M 11/2085; F16M 11/2092; F16M 2200/027
USPC ............ 361/679.01, 679.02, 679.21, 679.26, 361/679.27, 679.22, 679.04, 679.05, 361/679.23; 248/917–924
See application file for complete search history.

(56) References Cited

U.S. PATENT DOCUMENTS

| | | |
|---|---|---|
| 2007/0205340 A1 | 9/2007 | Jung |
| 2008/0117578 A1 | 5/2008 | Moscovitch |
| 2008/0225472 A1* | 9/2008 | Chih ...................... F16M 11/10 361/679.04 |
| 2009/0134285 A1* | 5/2009 | Huang .................. F16M 11/08 248/124.1 |
| 2010/0128423 A1 | 5/2010 | Moscovitch |

\* cited by examiner

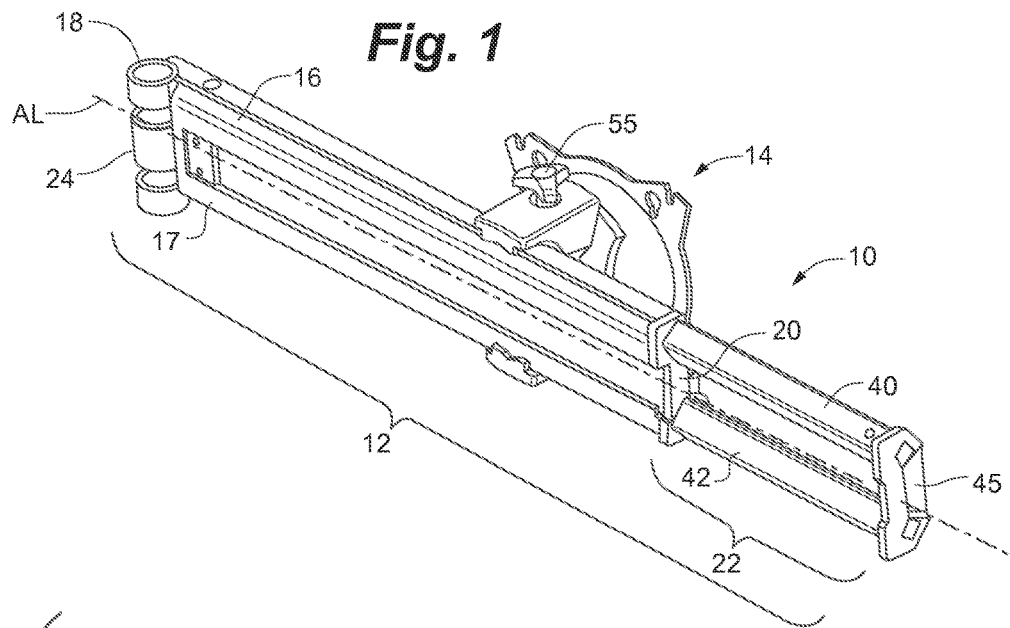
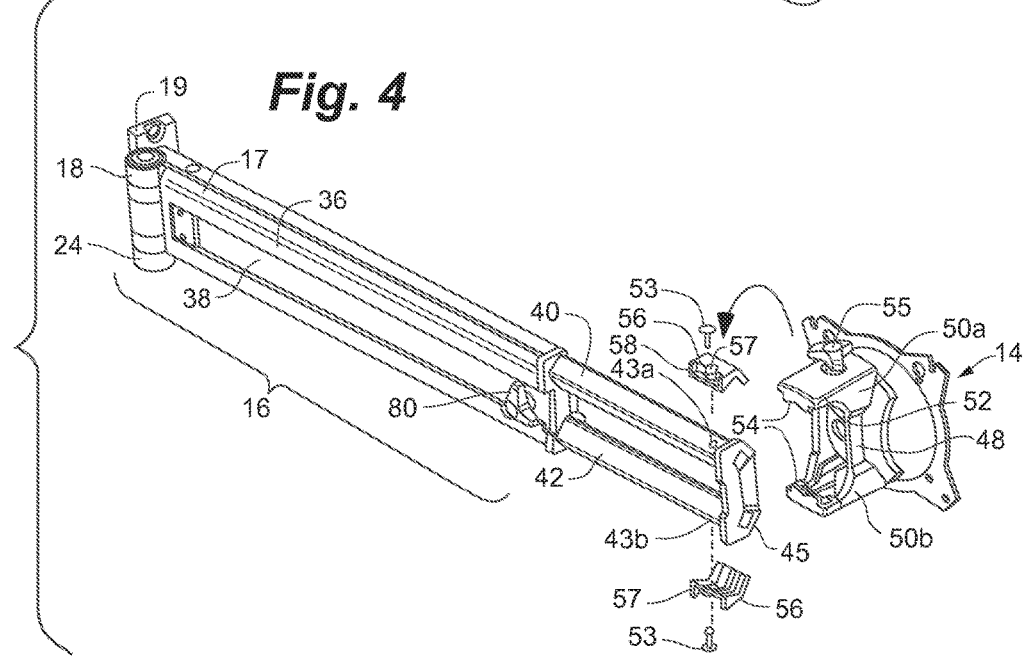

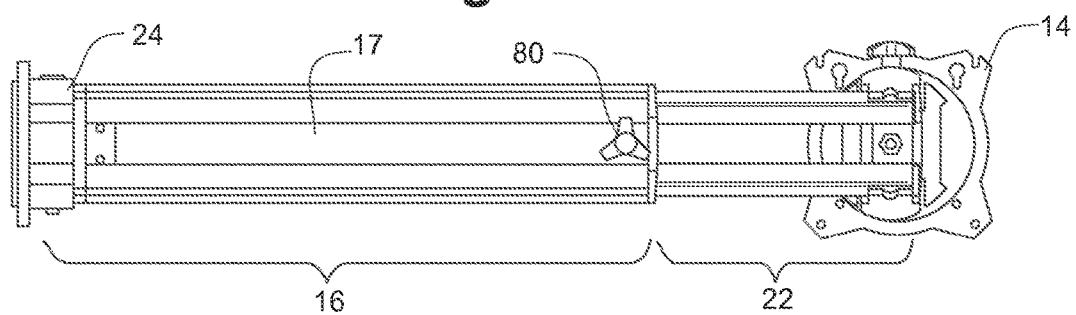
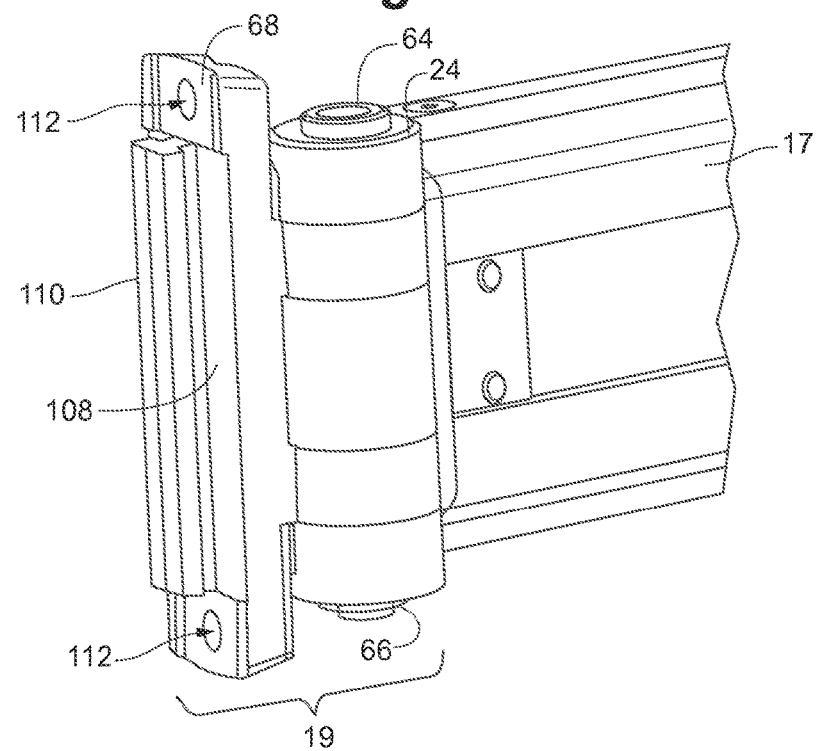

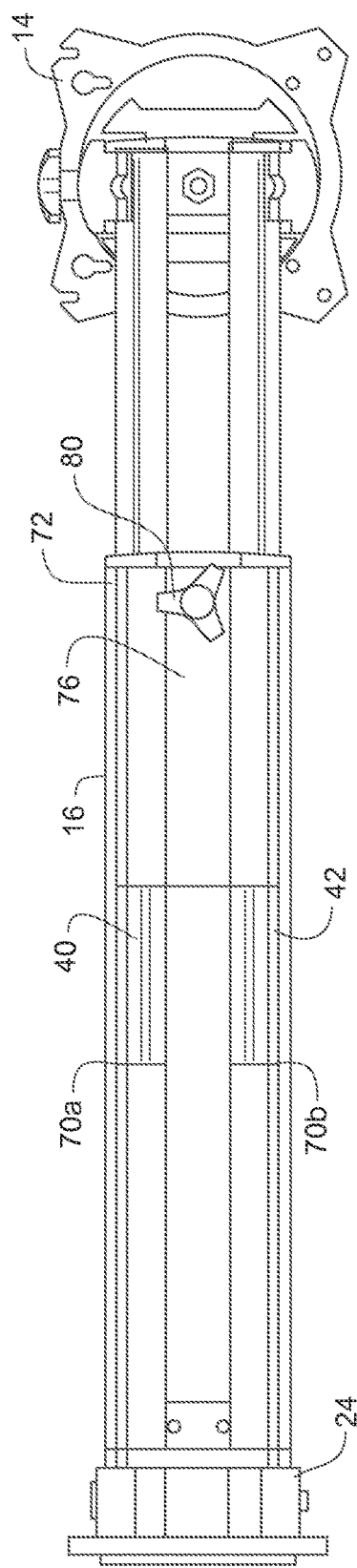

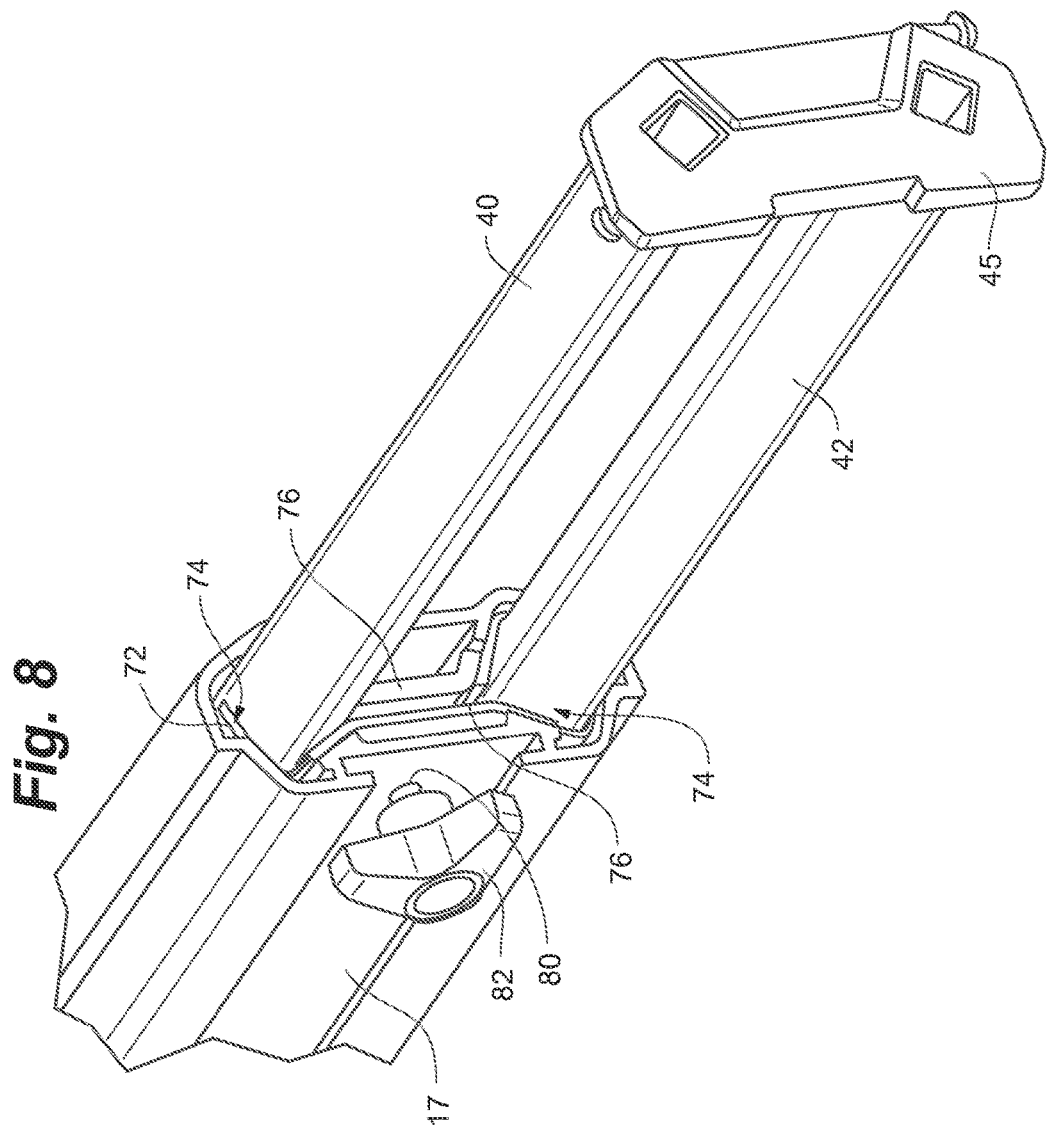

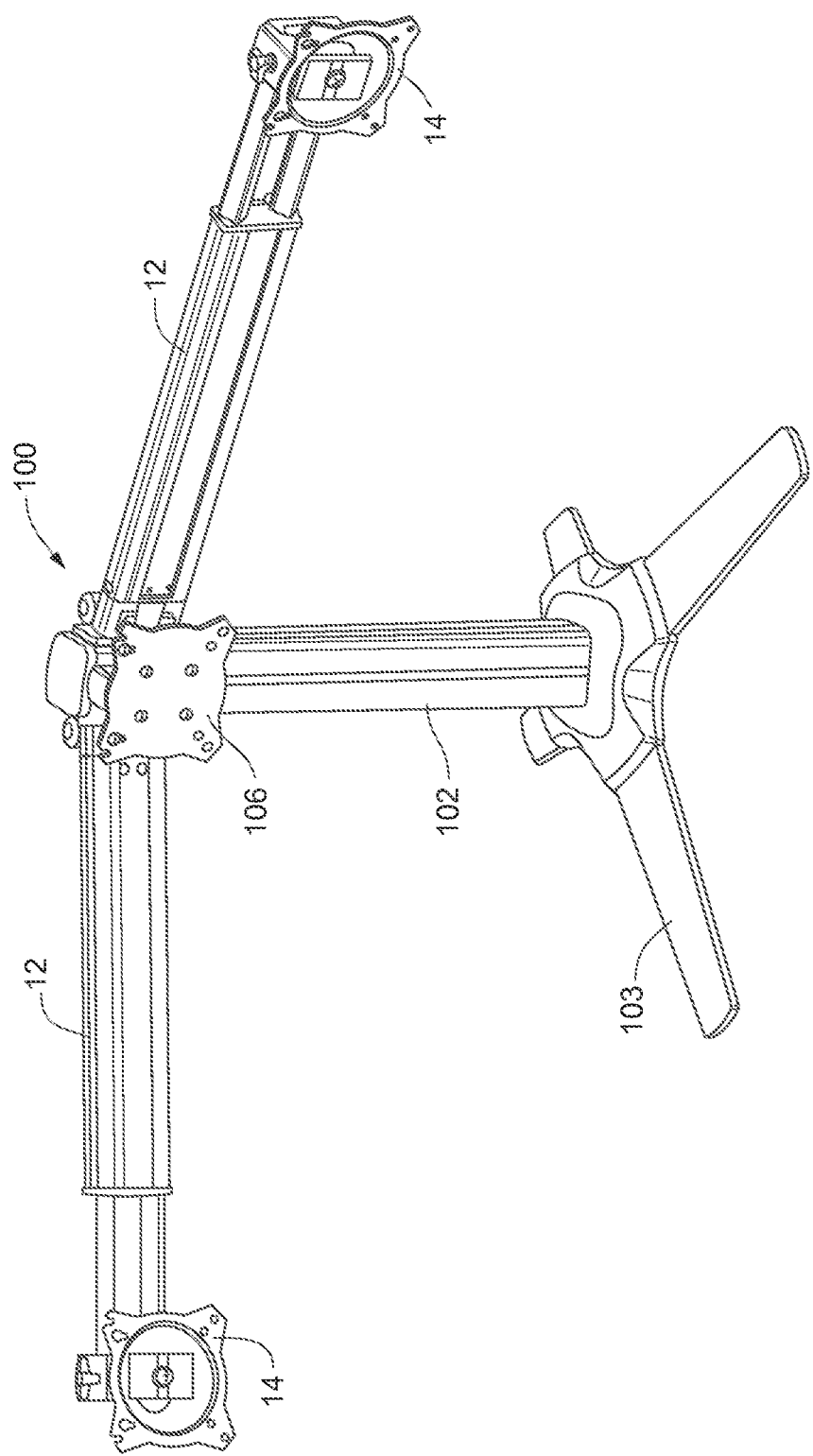

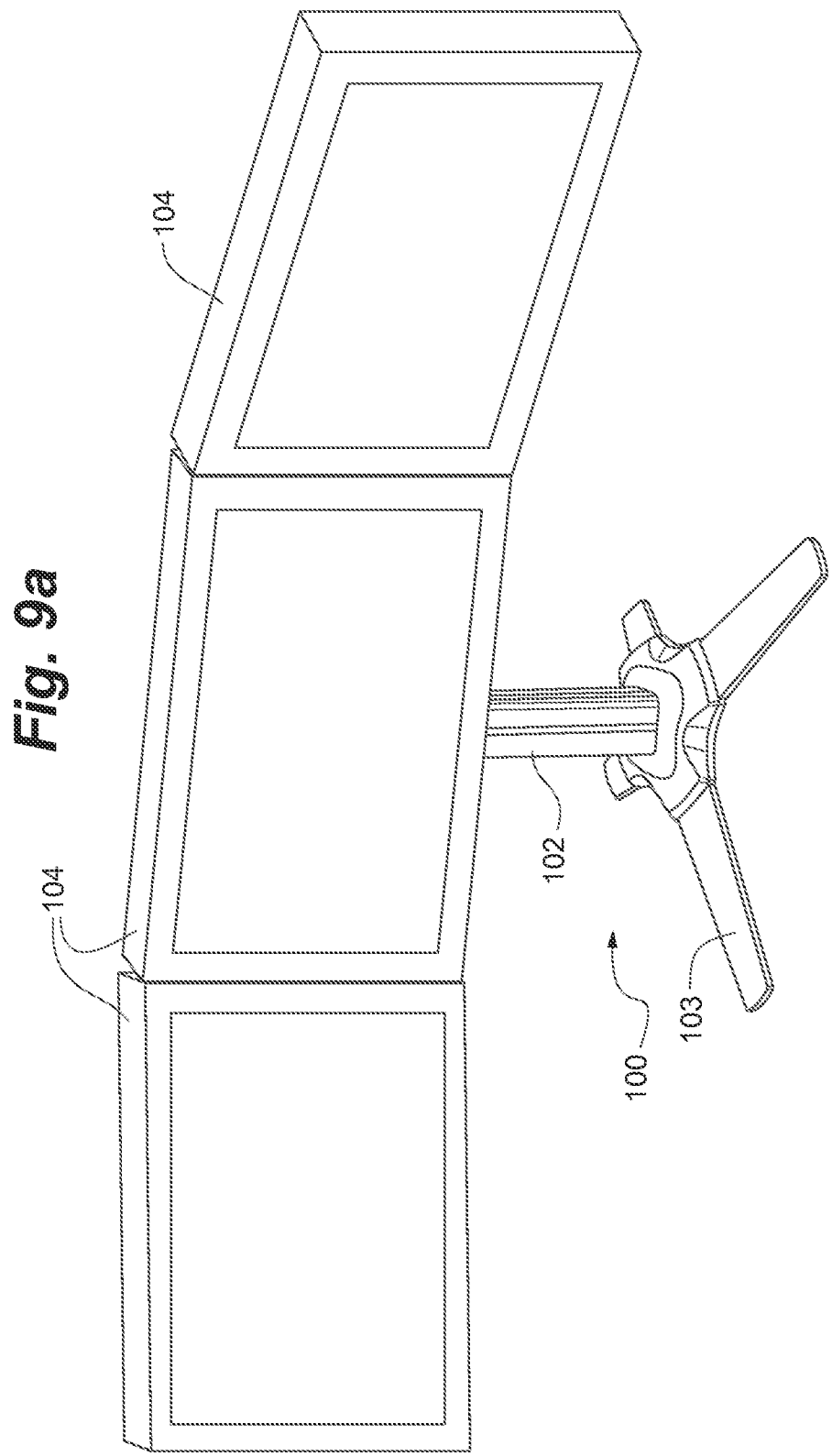

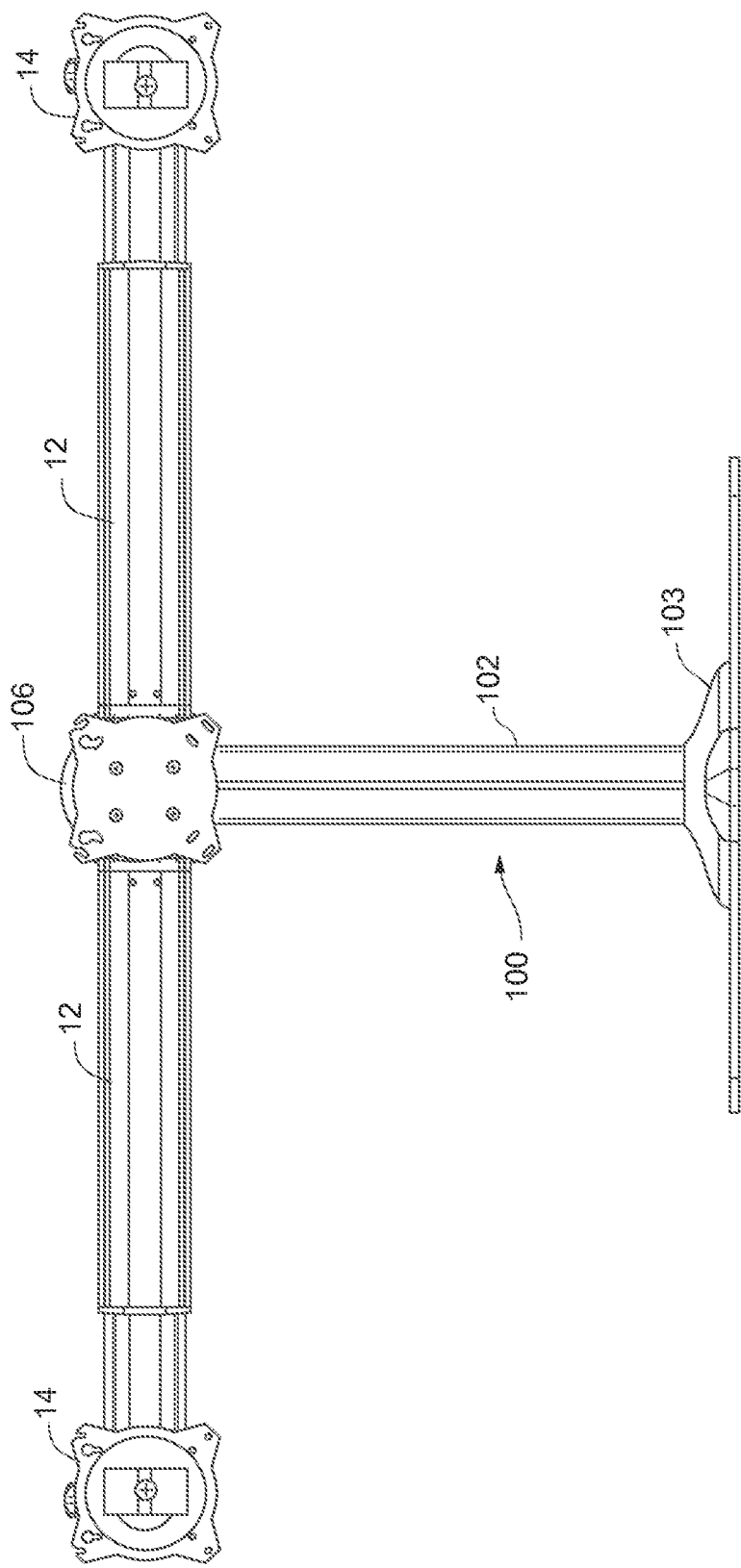

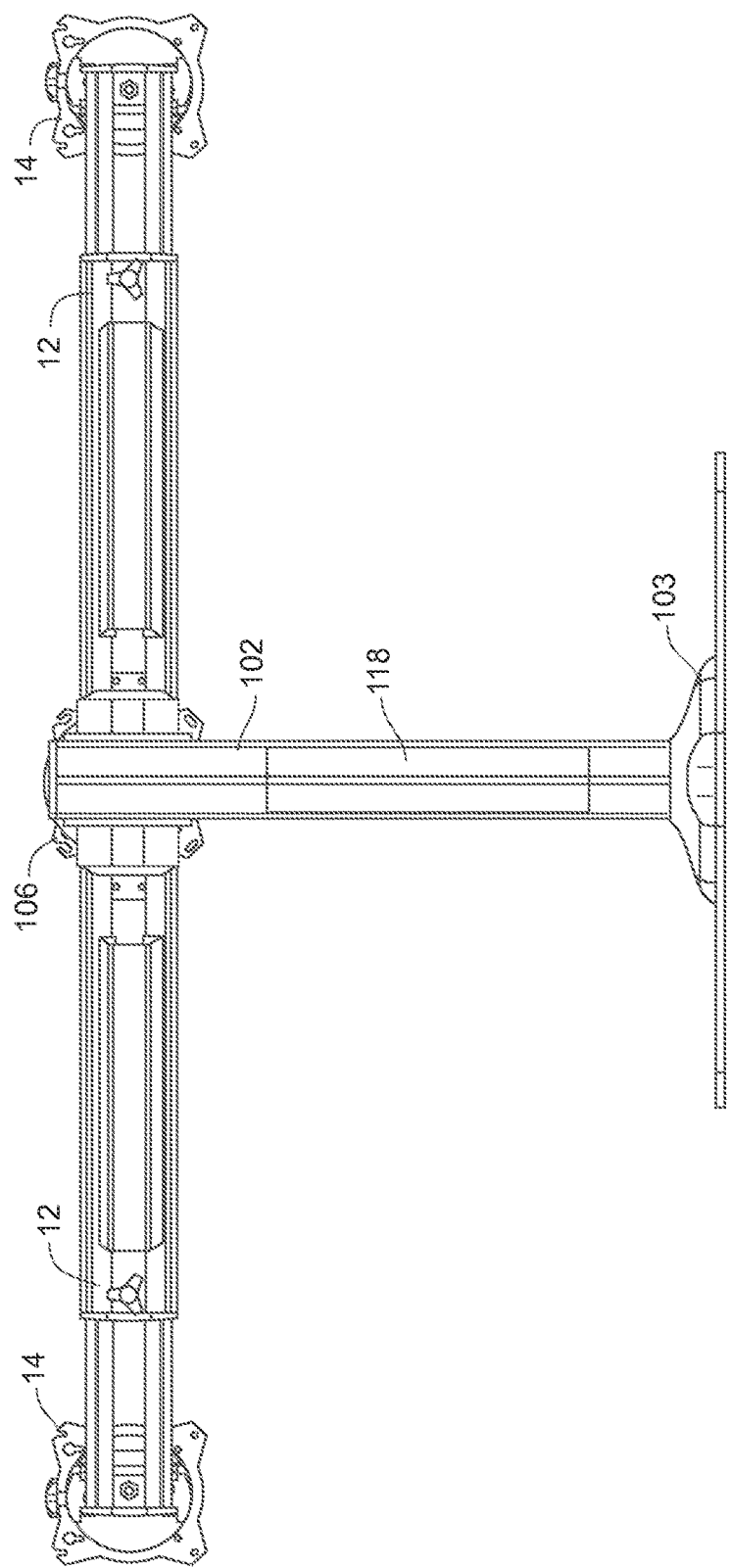

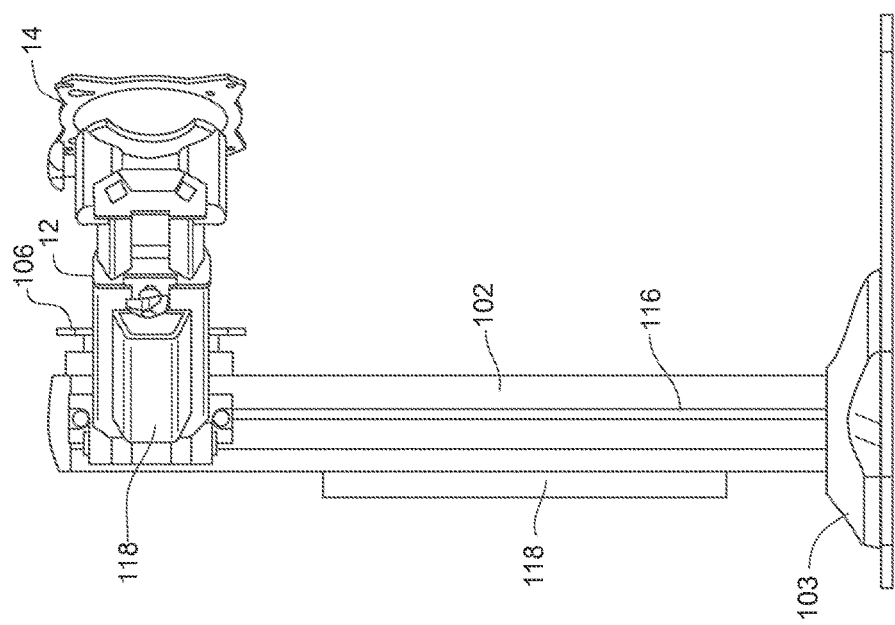

TELESCOPING RAIL MOUNTING ASSEMBLY AND MULTIPLE DISPLAY MOUNT SYSTEM

RELATED APPLICATIONS

The present application is a National Stage entry of PCT Application No. PCT/US2013/030243, filed Mar. 11, 2013, which claims the benefit of U.S. Provisional Application No. 61/641,670, filed May 2. 2012, and entitled TELESCOPING RAIL MOUNTING ASSEMBLY AND MULTIPLE DISPLAY MOUNT SYSTEM, said applications being hereby incorporated by reference in their entirety.

FIELD OF THE INVENTION

The invention relates generally to monitor mount systems, and more particularly to systems for receiving and mounting one or more monitors at various lateral positions.

BACKGROUND OF THE INVENTION

Commercially available adjustable arms for mounting one or displays or monitors include articulating arms, such as hinged articulating arm assemblies, that include a fixed mount head at an end of the arm. The monitor is secured to the mount head via an interface. The monitor's position relative to the user is then adjusted via adjustment of the arms relative to one another and to a fixed structure such as a wall or a desk top.

Another type of mount system includes an array rail releasably coupled to a column. One or more mount heads are releasably secured anywhere along a longitudinal axis of the array rail. The monitor is secured to the mount head. To adjust the lateral position of the monitor relative to the user, the mount head is unsecured from the rail, moved to a new position along the longitudinal axis of the rail, and secured in the new position. However, this can often times require time-consuming and/or awkward steps including dismounting of the monitor from the head and remounting the monitor once the head is repositioned on the rail.

One type of multi-display mount system is described in U.S. Reissue Pat. No. 36,978 to Moscovitch. In this case, multiple electronic displays are mounted to a single arm assembly that is adjustable relative to a base. However, the mount system provides a limited range of motion for adjustment of each display relative to the base.

There remains a need for a mount system in which the lateral position of the monitor relative to the user is easily and efficiently adjusted, and offers a wider range of motion with respect to a base or other mounting structure.

SUMMARY OF THE INVENTION

The present invention addresses the need in the industry tor a multiple display mount system which offers easy and efficient, independent lateral and vertical adjustment of each individual display.

In an embodiment, a system for mounting a plurality of electronic displays includes a base, a vertical member extending upwardly from the base, and a pair of arms extending laterally outward on opposing sides of the vertical member. A pair of display interfaces, each for receiving a separate one of the plurality of electronic displays, is operably coupled to a separate one of the arms. The system includes a base, a vertical member extending upwardly from the base, and a pair of arms extending laterally outward on opposing sides of the vertical member. A pair of display interfaces is operably coupled to a separate one of the arms. Each of the display interfaces can enable the electronic display received thereon to be tilted about a generally horizontal tilt axis extending through the electronic display, and/or enable the electronic display received thereon to be pivoted about a generally vertical axis extending through the electronic display. The arms may be pivotally connected to the vertical member to enable positioning of the displays, and the displays may be separately vertically positionable relative to the vertical member.

Each of the pair of arms can be pivotally attached to the vertical member. A third display interface may be directly attached to the vertical member, and can be made selectively shiftable along the vertical member. Each of the pair of display interfaces may be horizontally shiftable along the arm to which the display interface is operably coupled. Each arm may include two portions, the two portions being telescopically siidable relative to each other to selectively alter a length of the arm.

In further embodiments, an electronic display system can include a plurality of electronic displays, a base, a vertical member extending upwardly from the base, and a pair of arms extending laterally outward on opposing sides of the vertical member. A pair of display interfaces, each for receiving a separate one of the plurality of electronic displays, is operably coupled to a separate one of the arms. Each of the display interfaces can enable the electronic display received thereon to be tilted about a generally horizontal tilt axis extending through the electronic display, and/or enable the electronic display received thereon to be pivoted about a generally vertical axis extending through the electronic display.

Each of the pair of arms can be pivotally attached to the vertical member. A third display interlace may be directly attached to the vertical member, and can be made selectively shiftable along the vertical member. Each of the pair of display interfaces may be horizontally shiftable along the arm to which the display interface is operably coupled. Each arm may include two portions, the two portions being telescopically slidable relative to each other to selectively alter a length of the arm.

In a further embodiment, a mount for a plurality of electronic displays includes a generally vertical member, at least one rail assembly operably coupled to the vertical member, and a pair of mount heads, each of the mount heads for receiving a separate one of the plurality of electronic displays, at least one of the mount heads operably coupled to the rail assembly. The vertical member may be a column or a column in embodiments of the invention. The other of the pair of mount heads can be attached directly to the vertical member.

BRIEF DESCRIPTION OF THE FIGURES

The embodiments of the present invention may be more completely understood in consideration of the following detailed description of various embodiments in connection with the accompanying drawings, in which:

FIG. 1 is an isometric view of a rail assembly of a mount system according to an embodiment of the invention in which a mount head is mounted to a housing of the rail assembly;

FIG. 4 is an exploded view of the mount head being mounted to the telescoping arms of the rail assembly;

FIG. 5 is a rear elevation view of the rail assembly according to FIG. 1;

FIG. 6 is a partial end isometric view of a coupling means according to an embodiment of the invention for securing a rail assembly to a base;

FIG. 7 is a rear elevation view of the arm assembly of FIG. 5 with portions of the arm assembly depicted in phantom;

FIG. 8 is an end isometric view of the arm assembly of FIG. 7 with the end cap removed;

FIG. 9 is an isometric view of a multiple display mounting system according to an embodiment of the present invention;

FIG. 9a is an isometric view of the system of FIG. 9 with electronic displays mounted thereon;

FIG. 10 is a front elevation view of the mounting system of FIG. 9;

FIG. 11 is a rear elevation view of the mounting system of FIG. 9;

FIG. 12 is a right elevation view of the mounting system of FIG. 9;

Figure 2:
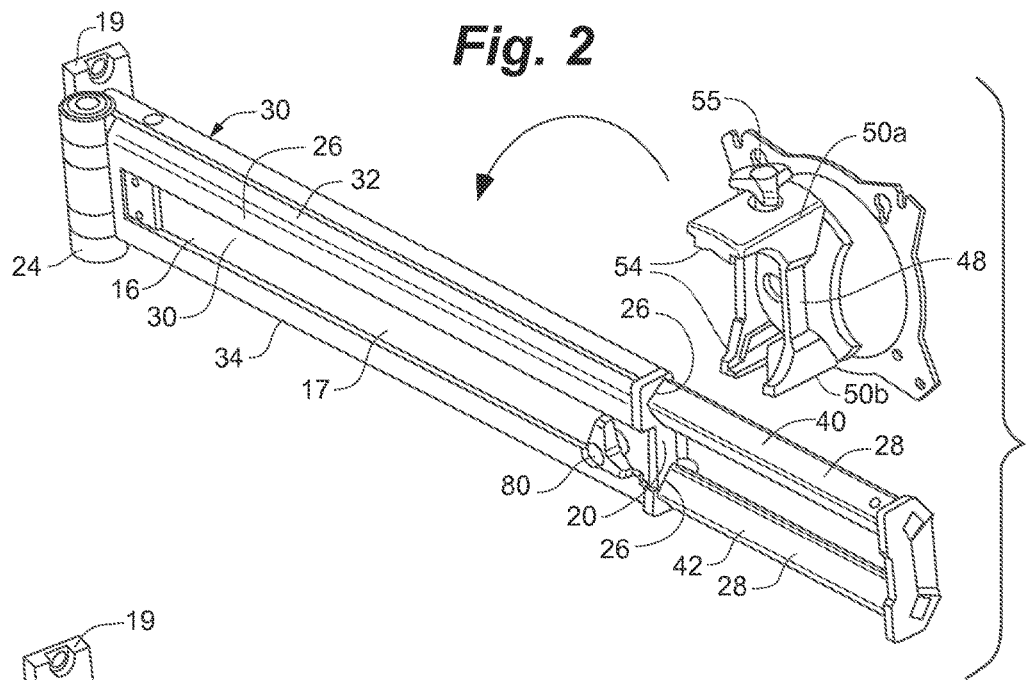
FIG. 2 is an exploded view of the mount head being mounted to the housing of the rail assembly.
Figure 3:
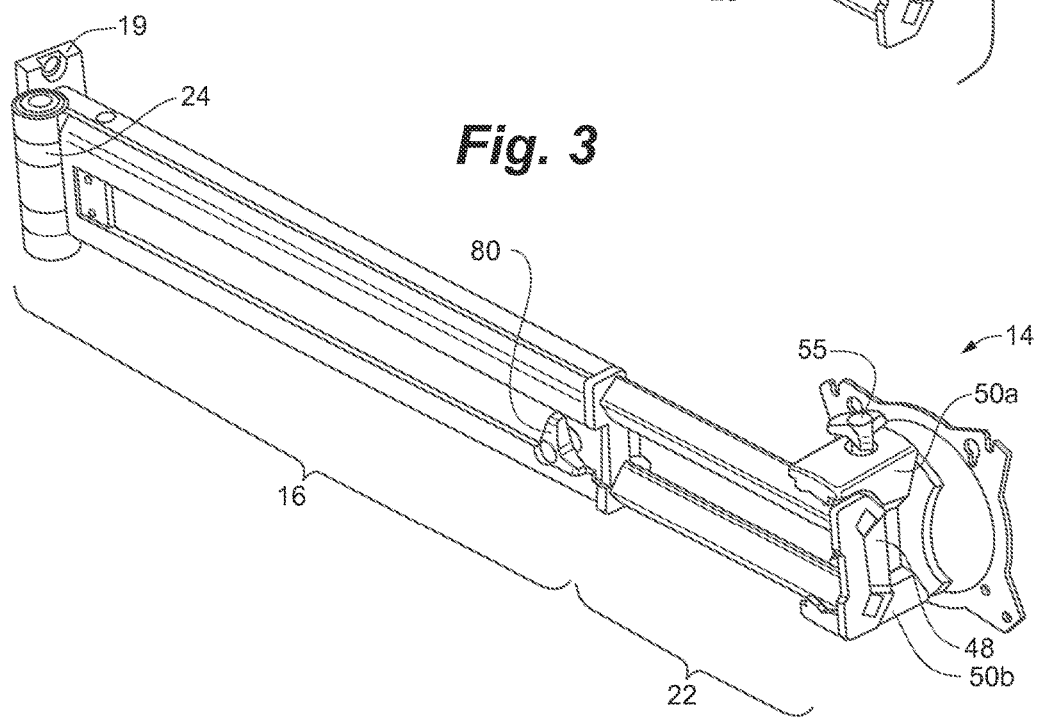
FIG. 3 is a rear isometric view of the rail assembly according to FIG. 1, in which a mount head is mounted to telescoping arms of the rail assembly.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

In FIGS. 1-8 there is depicted a system 10 for mounting electronic displays or monitors, such as flat screen computer monitors, according to an embodiment of the invention. System 10 generally includes a rail assembly 12, mount head 14 releasably mountable to rail assembly 12, and a coupling means 19 for securing the rail assembly to a base. Rail assembly 12 generally includes a housing 16 having an outer covering 17, a first end 18, and a second end 20, and a telescoping arm assembly 22 that is extendable from an interior of housing 16.

First end 18 of housing 16 includes coupling means 19 attached thereto for mounting assembly 12 to a base or arm, such a dual arm swivel or swing assembly, a column or pole, or any of a variety of suitable mount systems. In one embodiment, as shown in FIGS. 1-4 and 6 coupling means 19 includes a hinge 24 for mounting to a corresponding hinge of a second arm or array, or for securing to a free-standing base. In one particular embodiment, shown in FIGS. 5 and 6, hinge 24 is pivotably coupled to a corresponding hinge 62 via threaded pivot pin 64 secured by nut 66. Hinge 62 includes column interface 68 for securing to a base such as a free standing or anchored column.

Second end 20 of housing 16 includes structure defining one or more apertures 26 for receiving and housing one or more telescoping arms 28 of arm assembly 22.

At least one surface of outer covering 17 of housing 16 includes structure defining a track 30. In one embodiment of the invention, both a top 32 and bottom 34 of outer covering 17 includes an L-shaped track 30, including a ridge portion 36 and a recessed portion 38, for slidingly receiving mount head 14 thereon.

In one embodiment of the invention, shown in FIGS. 1-4, telescoping arm assembly 22 includes a first arm 40, and a second arm 42 substantially parallel to first arm 40, both of which are substantially parallel to a longitudinal axis $A_L$ of housing 16. First and second arms 40, 42 are substantially a same length of housing 16 such that arms 40, 42 can completely nest within housing 16. In an alternative embodiment of the invention not shown, each of the arms comprises a plurality of coaxial, concentric nesting pieces telescoping receivable within each other and within the housing such that a total arm length (i.e. when all pieces are completely extended with respect to one another) is greater than a length of the housing.

Referring to FIGS. 7-8, a first end 70a, 70b of arms 40, 42 extend within housing 16 and are restrained from extending outside of housing 16 so that arm assembly 22 does not separate from housing 16. An internal sleeve 72 couples aims 40, 42 near first ends 70a, 70b. Sleeve 72 includes structure defining apertures 74 for receiving and retaining at least a portion of arms 40, 42. A web portion 76 extends on each side of arms 40, 42 between each aperture 74. Web portion 76 includes structure 77 defining an aperture 78 for receiving a fastening device SO, such as a threaded bolt and knob. Outer covering 17 includes corresponding apertures (not shown) on a first side such that knob portion 82 of fastening device 80 remains on an external surface of outer covering 17.

Second ends 43a, 43b of arms 40,42 are coupled by an end cap 45. End cap 45 prevents mount head 14 from sliding off the end of arm assembly 22. When arm assembly 22 is completely contained within housing 16, end cap 45 sets flush with a side wall 47 of outer covering 17 of housing 16.

Each of arms 40, 42 includes structure defining an aperture 52 for receiving a fastener 53, such as a screw, to secure a reducer 56 thereto. Reducer 56 provides structure to arms 40, 42 conforming track 30 of each of top and bottom portions 32, 34 of outer covering 17. For example, reducer 56 can comprise a ridge portion 58 and a recessed portion 60 forming a track. Reducer 56 further comprises structure defining an aperture 57 for receiving fastener 53 therethrough. When a reducer 56 is secured to an exterior surface of each arm 40, 42, a total height of arm assembly 22 is substantially equal to a height of housing 16.

In one embodiment of the invention, mount head 14 comprises an Array Turn-Tite Centris™ Head (KTA1005 Series) available from Chief® Professional AV Solutions (see http://www.chiefmfg.com/Series/KTA1005, incorporated herein by reference in its entirety). Such heads are described in, for example, in U.S. Pat. Nos. 7,028,961 and 7,380,760, both of which are incorporated by reference in their entireties. Mount head 14 generally includes a monitor interface 44, an adjustment assembly 46, such as found in the Centris™ head, and a mounting bracket 48. The adjustment assembly can include, for example, a frusto-spherical shell attachable to the back of the monitor or display, the shell being slidable between two guide structures in any direction to position the display. The monitor tilts about a multiplicity of axes extending through the center of the radius of curvature of the shell, which may be positioned within the monitor.

Mounting bracket 48 includes a top and bottom portions 50a, 50b, each portion including a wall 52, and a flange 54 extending therefrom. Flanges 54 are receivable on ridge portion 36 of top and bottom portions 32, 34, respectively, of outer covering 17 of housing 16. Mounting bracket 48 further includes tin adjustment knob 55 for securing mount head 14 to rail assembly 12 upon rotation of adjustment knob 55.

As shown in FIG. 2, mount head 14 can be secured to housing 16 by placing mounting bracket 48 on track 30 such that flanges 54 are flush with ridge portions 36. Mount head 14 is then slidingly adjustable along track 30 of housing 16. Once mount head 14 is at a desired lateral position on housing 16, adjustment knob 55 is tightened by rotation.

Alternatively or in addition to the mount head mounted on housing 16, mount head 14 can be mounted on arm assembly 22, as depicted in FIG. 4. In one embodiment, a reducer 56 is secured to each arm 40 and 42 by insertion of fasteners 53 through aperture 57 of reducer 56 and aperture 52. Mount head 14 is then secured to arm assembly 22 by placing mounting bracket 48 on reducers 56 secured to arm assembly 22 such that flanges 54 are Hush with ridge portions 58. Adjustment knob 55 is tightened by rotation to secure mount head 14 thereto.

Arm assembly 12 can be slidingly adjusted relative to housing 16 along axis $A_L$ until the desired lateral position of mount head 14 is achieved. Referring back to FIG. 8, when the desired lateral position of mount head 14 is achieved, knob portion 82 of fastening device 80 is rotated. In response, web portions 76 of sleeve 72 are forced towards one another, forcing apertures 74 to tighten around arms 40, 42, such that the arm assembly 22 is secured from further lateral movement relative to housing 16 until fastener 80 is loosened.

Referring to FIGS. 9-12, a multi-monitor mount system 100 generally includes a central mounting column 102, a base 103, a plurality of rail assemblies 12 as described supra, a plurality of mount heads 14, each mount head 14 being mounted at a lateral position along a rail assembly 12 as described supra, and a display 104 mounted to each mount head 14 via display interface 44. Each rail assembly 12 is independently secured to a side of central, mounting column 102 such that each rail assembly 12 is independently height adjustable along central mounting column 102. Furthermore, each rail assembly 12 is rotationally adjustable about central mounting column 102 via hinge 24.

An optional central mount head 106 is secured directly central mounting column 102 for receiving an additional monitor 104. Mount head 106 is height adjustable along central mounting column, independent of each rail assembly 12.

Referring back to FIG. 6 and referring to FIG. 12, column interface 68 comprises a first surface 108 having a longitudinal raised portion 110. First surface 108 also includes structure defining one or more apertures 112 for receiving fasteners 114 therethrough.

Figure 13:
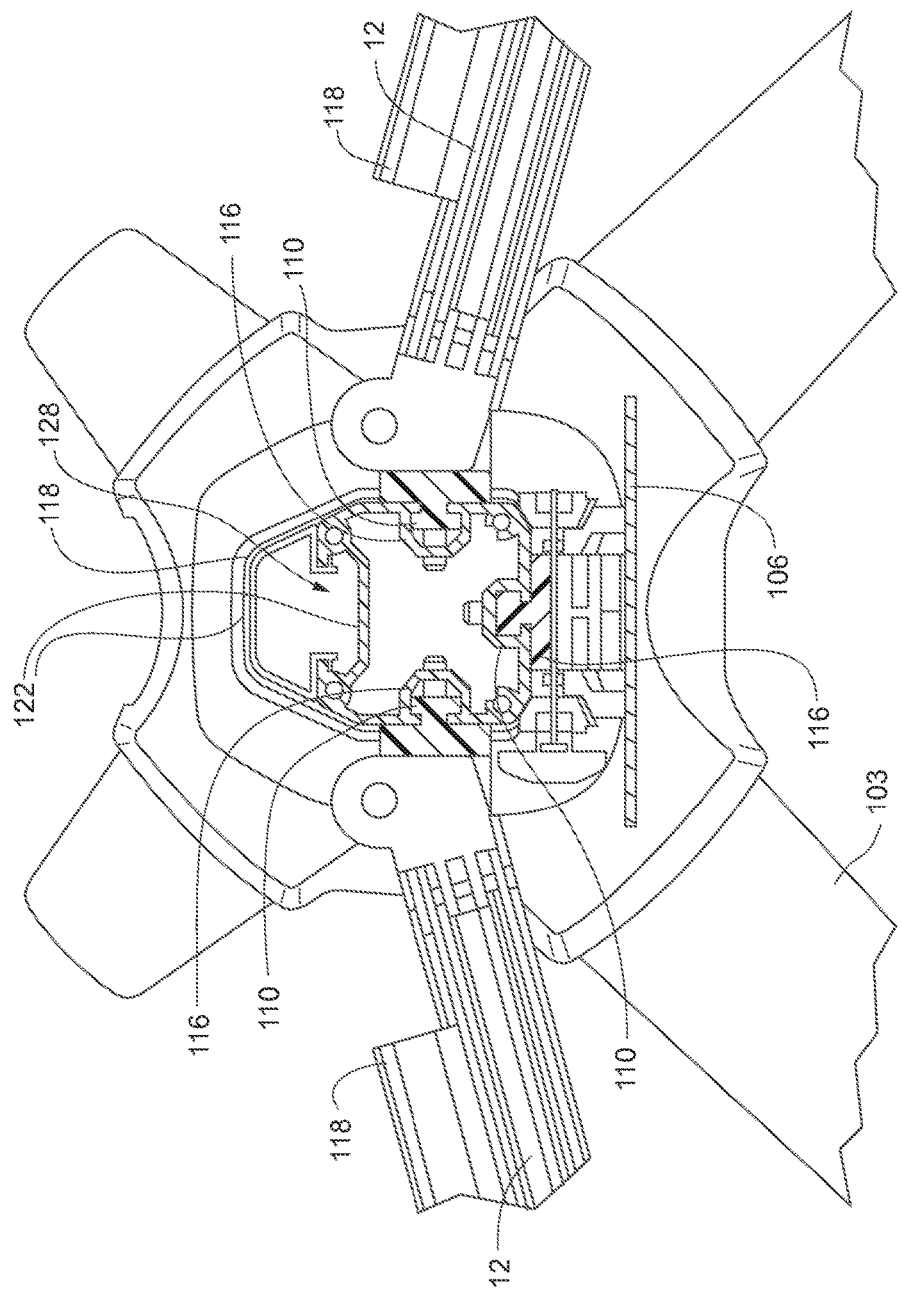
FIG. 13 is a partial section view of the mounting system of FIG. 9, taken at section 13-13 of FIG. 10.
Figure 14:
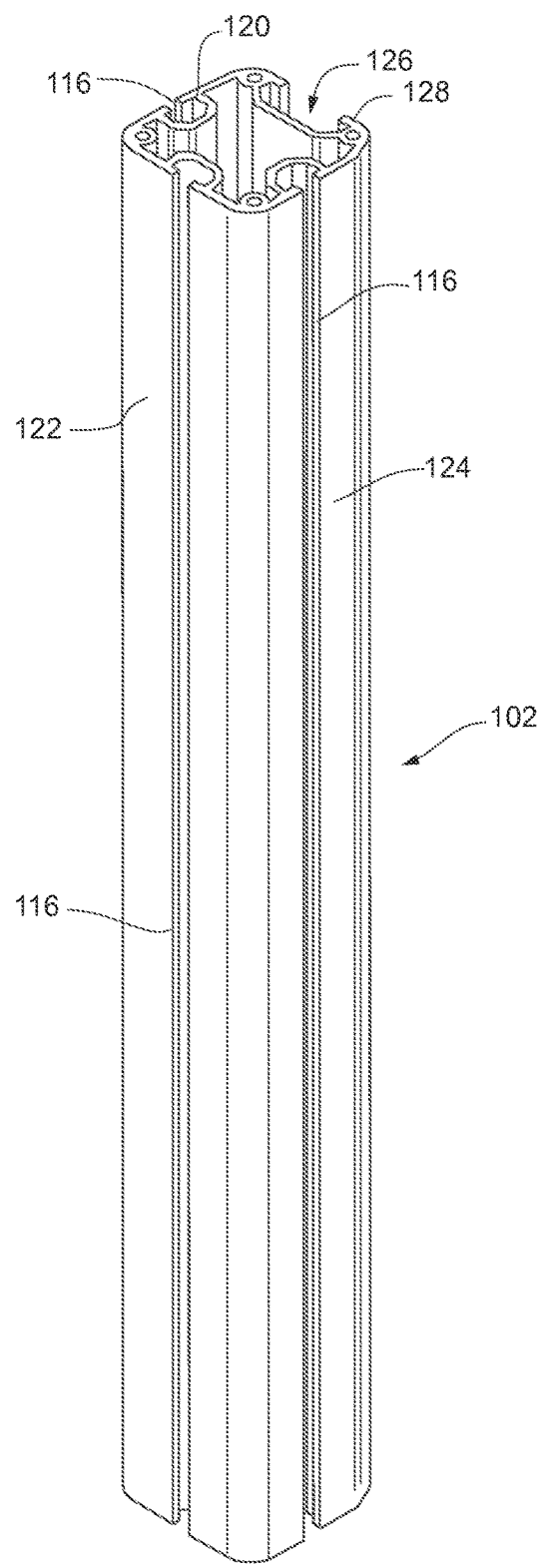
FIG. 14 is an isometric view of the mounting column of the system of FIG. 9.

As depicted in FIGS. 13 and 14, column 102 defines longitudinal grooves 116 in each of side faces 120, 122, 124, and defines a wire channel 126 in side face 12S. Each rail assembly 12 is secured to column 102 by fitting raised portion 110 into a corresponding longitudinal groove 116. When rail assembly 12 is adjusted to a desired vertical position relative to column 102, fasteners 114 are placed through apertures 112 and into groove 116. Fasteners 114 are tightened, e.g. by rotation, to secure rail assembly 12 at the desired vertical position. A second rail assembly 12 can be independently secured at the same or different vertical position along column 102 in the same manner, but in another longitudinal groove 116 defined on a different side of column 102.

Similarly, optional central mount head 106 includes a similar raised portion (not shown) that fits within a corresponding longitudinal groove 116. As a result, central mount head 106 can also be secured at an independent vertical position along column 102.

Optional wire channels 118 can be attached or clamped to a rear surface of one or more rail assemblies 12 and/or column 102 to conceal any wires extending to displays 104 such as for signal and power.

By providing independent rail assemblies for mounting a display thereon, system 100 provides a wider range of adjustment motion of each assembly 12 relative to column 102 in addition to the range of motion provided by each mount head 14. This is because each assembly 12 is independently adjustable along a vertical height of column 102, as well as being independently rotationally adjustable relative to the column due to hinge 24 on each assembly 12. Furthermore, more versatility lies in the ability to adjust mount head 14 laterally along assembly 12.

Mount systems according to embodiments of the invention allow for quick and efficient lateral adjustment of one or more monitors without the need for removing and remounting the display or monitor. Furthermore, the mount systems according to embodiments of the invention give a user additional options, range of motion, and flexibility for mounting multiple monitors to a central base.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 U.S.C. §112(f) are not to be invoked unless the specific terms "means for" or "step for" are recited in a claim.

What is claimed is:

1. A system for mounting a plurality of electronic displays, the system comprising:
   a base;
   a vertical member extending upwardly from the base;
   a pair of arms extending laterally outward on opposing sides of the vertical member; and
   a pair of display interfaces, each display interface for receiving a separate one of the plurality of electronic displays, each display interface operably coupled to a separate one of the arms, wherein each of the display interfaces enables the electronic display received thereon to be tilted about a multiplicity of axes extending through the electronic display.

2. The system of claim 1, wherein each of the pair of arms is pivotally attached to the vertical member.

3. The system of claim 1, further comprising a third display interface directly attached to the vertical member.

4. The system of claim 3, wherein the third mounting head is selectively shiftable along the vertical member.

5. The system of claim 1, wherein each of the pair of display interfaces is horizontally shiftable along the arm to which the display interface is operably coupled.

6. The system of claim 1, wherein each arm comprises two portions, the two portions being telescopically slidable relative to each other to selectively alter a length of the arm.

7. An electronic display system, the system comprising:
   a plurality of electronic displays;
   a base;
   a vertical member extending upwardly from the base;
   a pair of arms extending laterally outward on opposing sides of the vertical member; and
   a pair of display interfaces, each display interface receiving a separate one of the plurality of electronic displays thereon, each display interface operably coupled to a separate one of the arms, wherein each of the display interfaces enables the electronic display received thereon to be tilted about a multiplicity of axes extending through the electronic display.

8. The system of claim 7, wherein each of the pair of arms is pivotally attached to the vertical member.

9. The system of claim 7, further comprising a third display interface directly attached to the vertical member.

10. The system of claim 9, wherein the third mounting head is selectively shiftable along the vertical member.

11. The system of claim 7, wherein each of the pair of display interfaces is horizontally shiftable along the arm to which the display interface is operably coupled.

12. The system of claim 7, wherein each arm comprises two portions, the two portions being telescopically slidable relative to each other to selectively alter a length of the arm.

* * * * *